(12) United States Patent
Browne et al.

(10) Patent No.: US 11,418,495 B2
(45) Date of Patent: Aug. 16, 2022

(54) TECHNIQUES FOR FLOW CONTROL PACKET PROCESSING

(71) Applicant: INTEL CORPORATION, Santa Clara, CA (US)

(72) Inventors: John J. Browne, Limerick (IE); Chris Macnamara, County Limerick (IE); Namakkal N. Venkatesan, Hillsboro, OR (US); Tomasz Kantecki, Ennis (IE); Declan W. Doherty, Clondalkin (IE)

(73) Assignee: INTEL CORPORATION

( * ) Notice: Subject to any disclaimer, the term of this patent is extended or adjusted under 35 U.S.C. 154(b) by 1122 days.

(21) Appl. No.: 15/715,569

(22) Filed: Sep. 26, 2017

(65) Prior Publication Data
US 2019/0097984 A1   Mar. 28, 2019

(51) Int. Cl.
*H04L 29/06* (2006.01)
*H04L 9/40* (2022.01)
*H04L 47/10* (2022.01)
*H04L 69/166* (2022.01)
*H04L 47/2441* (2022.01)
*H04L 12/46* (2006.01)

(52) U.S. Cl.
CPC ......... *H04L 63/0485* (2013.01); *H04L 47/10* (2013.01); *H04L 63/0428* (2013.01); *H04L 69/166* (2013.01); *H04L 12/4633* (2013.01); *H04L 47/2441* (2013.01); *H04L 63/164* (2013.01)

(58) Field of Classification Search
CPC ............... H04L 63/0485; H04L 47/10; H04L 63/0428; H04L 69/166; H04L 12/4633; H04L 47/2441; H04L 63/164
USPC ........................................................ 713/153
See application file for complete search history.

(56) References Cited

U.S. PATENT DOCUMENTS

| 7,181,530 B1 * | 2/2007 | Halasz ................. H04W 12/122 709/228 |
| 2016/0080335 A1 * | 3/2016 | Elzur .................... H04L 9/3215 713/171 |
| 2017/0104851 A1 | 4/2017 | Arangasamy et al. |
| 2019/0028440 A1 * | 1/2019 | Eriksson ............. H04L 63/0485 |

* cited by examiner

*Primary Examiner* — Evans Desrosiers
(74) *Attorney, Agent, or Firm* — KDB Firm PLLC

(57) ABSTRACT

Techniques and apparatuses for processing data unit are described. In one embodiment, for example, an apparatus for networking may include at least one memory, logic, at least a portion of the logic comprised in hardware coupled to the at least one memory, the logic to access an encrypted packet having an encrypted portion, determine at least one flow control segment of the encrypted portion, decrypt the at least one flow control segment to generate a partially-decrypted packet comprising a decrypted at least one flow control segment and an encrypted remainder portion, the remainder portion comprising a portion of the encrypted packet that does not include the decrypted at least one flow control segment, access process information in the decrypted at least one flow control segment, and process the partially-decrypted packet according to the process information. Other embodiments are described and claimed.

24 Claims, 9 Drawing Sheets

TECHNIQUES FOR FLOW CONTROL PACKET PROCESSING

TECHNICAL FIELD

Embodiments described herein generally relate to communication networks and, more specifically, to processing packets within a communication network.

BACKGROUND

Security processes for communication networks typically involve encrypting data traffic flowing through secure tunnel connections, such as in a virtual private network (VPN) or IPSec-based network. In a typical secure tunnel connection, inner packets may be encrypted and encapsulated within outer packets. As such, the inner packets may not be accessible to network layers below those that performed the encryption. The inner packet may include information for determining appropriate processing and traffic flow assignments for packets transmitted within the communications network. For networks to perform meaningful operations, such as flow identification, an encrypted packet must be decrypted first before the workload can review the packet. In a typical network scenario, a single tunnel may contain thousands of traffic flows, each associated with thousands of packets. In addition, a packet may travel through multiple devices, gateways, or the like, each requiring access to the inner packet information. Accordingly, network operations on encrypted packets are subject to inefficiencies and processing costs due to the necessity of decrypting all or substantially all of each packet to make processing and/or traffic flow decisions.

DETAILED DESCRIPTION

Figure 1:
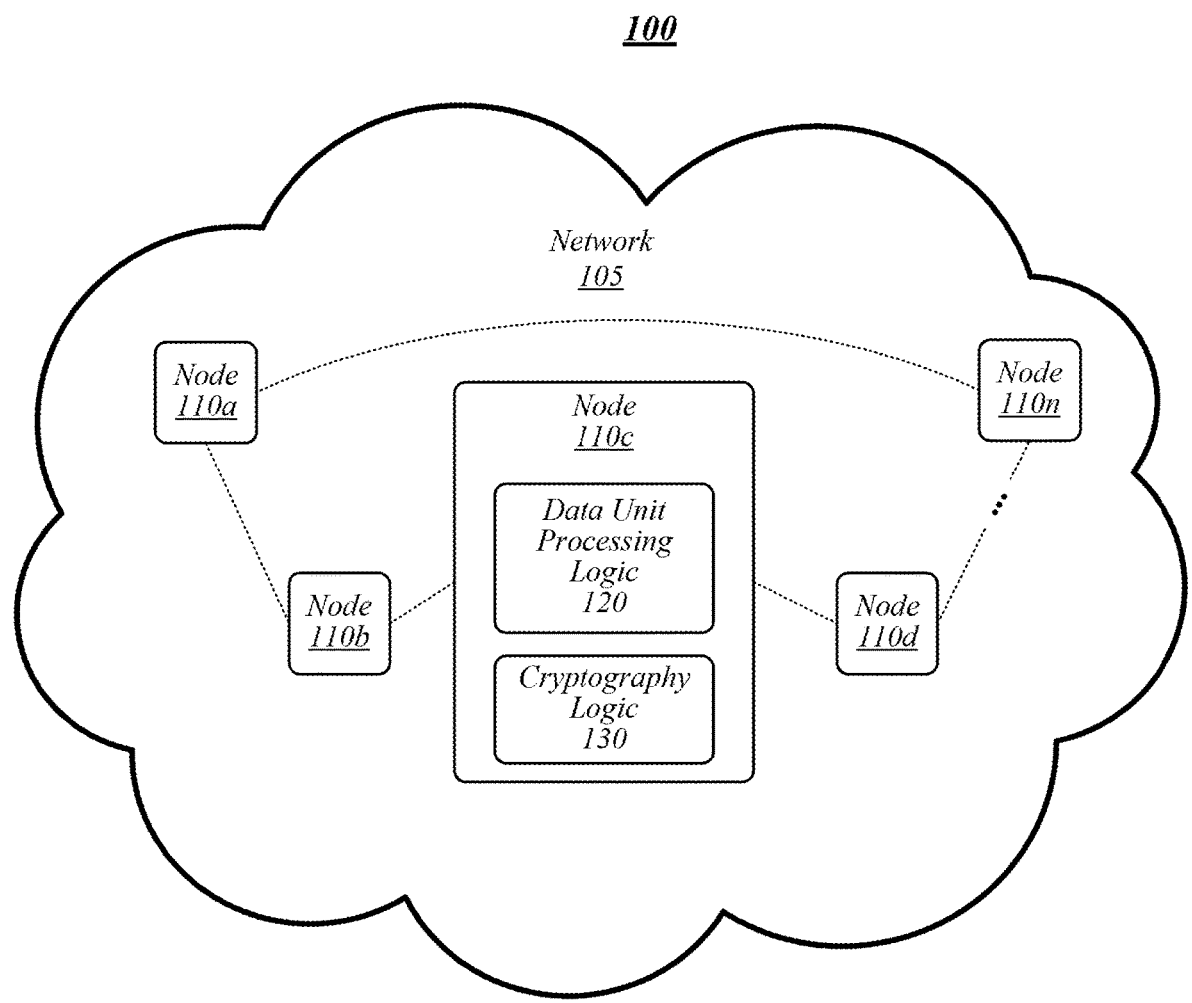
FIG. 1 illustrates an embodiment of a first operating environment.

Various embodiments may be generally directed to techniques for processing data units transmitted within a communication network. In general, a data unit may include a data structure used to transmit information within the communication network. In some embodiments, a data unit may be or may include a packet. A network device may be configured to receive and process data units. Non-limiting examples of a network device may include a computing device, a server, a gateway, a switch, a router, a network appliance, a middle box, a firewall, load balancer, and/or software operative on a computing device configured to implement any of the foregoing. For example, the network device may include a switch or middle box configured to receive a packet from a source device (either directly or indirectly), process the packet for flow control, and transmit the packet to the destination device based on the flow control information of the packet.

In exemplary embodiments, the data unit may include various segments, including, without limitation, one or more headers, payloads, and/or the like. One or more of the segments of the data unit may include data unit processing information configured to allow the network device to process the data unit. In some embodiments, processing of the data unit may include, but is not limited to, determining data unit priority, data unit conformity (for instance, whether or not the data unit is a non-conforming data unit), data unit destination, data unit source, and/or the like. In various embodiments, at least a portion of the data unit segments may be encrypted. In a conventional system, processing of the data unit requires decrypting all or substantially all of the data unit, such as a packet. However, in some embodiments, only the portion of the data unit that includes the data unit processing information may be decrypted to allow the network device to process the data unit. For example, the network device may only decrypt an inner header of an encrypted packet in order to determine whether the packet is a non-conforming packet and/or to determine a priority of the packet.

Accordingly, in some embodiments, a network device may be configured to use limited partial decryption of a packet to establish the type of packet (for instance, "peek" into the encrypted packet). The network device may then make determinations relating to policy, routing, quality of service (QoS), traffic flow, and/or the like without the need to decrypt the entire packet. In this manner, early identification of the encrypted packet allows for, among other things, high-priority packets to be accelerated through the packet processing operation and for non-conforming packets to be dropped earlier in the process in comparison to conventional systems.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of some embodiments. As shown in FIG. 1, operating environment 100 may include a network 105 interconnecting a plurality of nodes 110*a-n*. Network 105 may conform with various networking protocols, such as an Institute of Electrical and Electronics Engineers (IEEE) 802 family of standards, such as wireless devices operatively disposed of in wired communication (for example, IEEE 802.1 and/or 802.3) and wireless communication (for example, IEEE 802.11). This includes at least WiFi (or Wireless Fidelity), WiMax, and Bluetooth™ wireless technologies, third generation (3G) wireless technologies, fourth generation (4G) wireless technologies, fifth generation (5G) wireless technologies, long-term evolution (LTE) wireless technologies, among others, and/or any developments, revisions, or any other variations of any of the foregoing.

Nodes 110a-n may include various network devices interconnected with network 105. Non-limiting examples of nodes may include networking equipment, switches, hubs, routers, nodes (for instance, an eNodeB), firewalls, gateways, middle boxes, servers, computing devices, mobile computing devices, smartphones, tablet computing devices, workstations, personal computers (PCs), laptops, software operating on a computing device implementing any of the foregoing, and/or the like. In some embodiments, certain of nodes 110a-n may include computing devices communicating via networking equipment, devices, and/or the like. For example, node 110a may be a server communicating with a mobile device or workstation at node 110n via networking equipment and/or processes at nodes 110b-d (for instance, switches, firewalls, middle boxes, and/or the like). In another example, node 110a may include a tablet computing device communicating with a smartphone at node 110n via one or more of nodes 110b-d.

In some embodiments, nodes 110a-n may transmit information within network 105 using data units, including packets. Non-limiting examples of packets may include an Internet protocol (IP) packet (for instance, an IP version 4 (IPv4) packet and/or an IP version 6 (IPv6) developed by the Internet Engineering Task Force (IETF)), a Real-Time Protocol ("RTP") packet, a User Datagram Protocol ("UDP") packet, a transport Control Protocol ("TCP") packet, and/or the like. In various embodiments, a security protocol may be applied to the data unit. For example, Internet Protocol Security (IPSec), secure socket layer (SSL), and/or the like. In general, IPSec is a set of security protocols developed by the IETF to provide security services at the IP layer of a network. IPSec provides two protocols for security, namely the IP Authentication Header ("AH") protocol and the Encapsulating Security Payload (ESP) protocol. AH may provide connectionless integrity, data origin authentication and optional anti-replay services while ESP may provide encryption, limited traffic flow confidentiality, connectionless integrity, data origin authentication and anti-replay services.

IPSec-protected IP packets may be transmitted in "transport mode" and/or "tunnel mode." Transport mode transmission may be used for secure transmission of an IP packet from a source node (for instance, node 110a) directly to its ultimate destination node (for instance, node 110n), without any intermediate security devices, for example, between peer nodes (for instance, nodes 110b-d). Tunnel mode, on the other hand, is typically used when the packet from a source node must traverse through additional security devices such as security gateways (including one or more routers, firewalls, and/or other network devices) prior to arriving at the destination node. Tunnel mode may also be used to hide the flow details of the packet because only the tunnel entry and exit points are visible to anyone who may intercept the packet. Although IPSec-protected packets may be used in some examples, embodiments are not so limited, as any type of decrypted packet may be used according to various embodiments. In some embodiments, at least one of nodes 110a-n may include data unit processing logic 120 and/or cryptography logic 130 configured according to some embodiments. For example, node 110c may be configured the same or substantially similar to apparatus 205 of FIG. 2.

Figure 2:
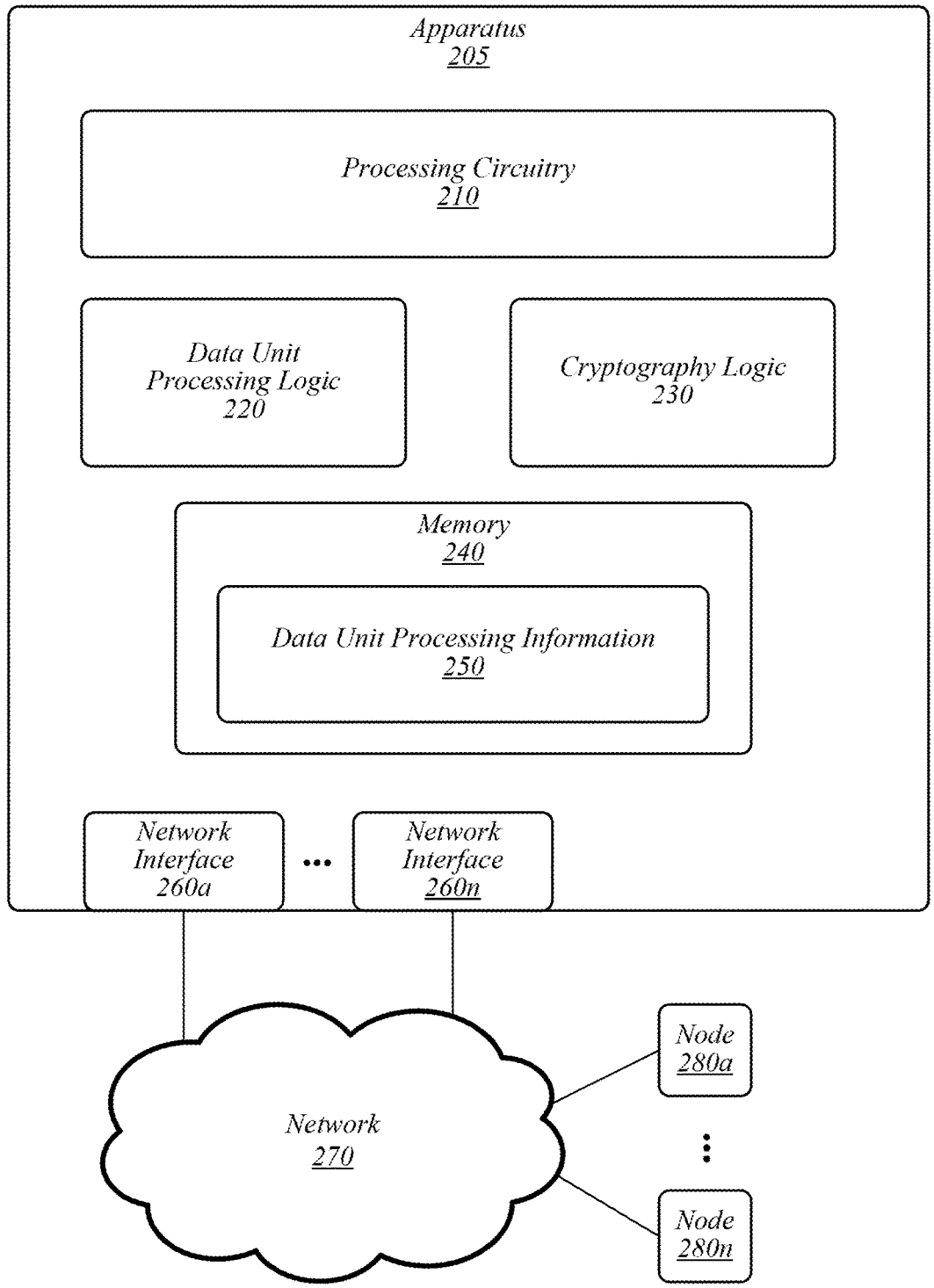
FIG. 2 illustrates an embodiment of a second operating environment.

FIG. 2 illustrates an example of an operating environment 200 that may be representative of some embodiments. As shown in FIG. 2, operating environment 200 may include an apparatus 205 having a processing circuitry 210, a memory 240, and one or more network interfaces 260a-n. Network interfaces 260a-n may include various networking hardware and/or software elements, circuitry, devices, logic, and/or the like for receiving and/or transmitting data packets. For example, network interfaces 260a-n may include one or more Ethernet ports and/or wireless transceivers. In some embodiments, apparatus 205 may be or may be substantially similar to one of nodes 110a-n of FIG. 1 (for instance, node 110c).

Processing circuitry 210 may include and or may access logic having instructions for performing operations according to some embodiments. Processing circuitry 210 may be communicatively coupled to memory 240 and/or network interfaces 260a-n. In some embodiments, processing circuitry 210 may include a system-on-a-chip (SoC), a central processing unit (CPU), accelerators, logic gates, and/or the like. In various embodiments, processing unit 210 may include an Intel® Xeon® processor. Apparatus 205 may be or may include various network devices, including computing devices (for instance, a server), networking equipment, and/or software applications for implementing networking functions. For example, apparatus 205 may be or may implement a middle box, a router, a switch, a firewall, a VPN, an IPSec tunnel, and/or the like. In some embodiments, apparatus 205 may be a middle box for controlling the flow of traffic within network 205, for instance, according to an IPSec security protocol.

Processing circuitry 210 may include and/or may access various logic for performing processes according to some embodiments. For instance, processing circuitry may include and/or may access data unit processing logic 220 (or "packet processing logic" for embodiments in which data units include packets) and/or cryptography logic 230. Data unit processing logic 220 and/or cryptography logic 230 may be implemented in hardware, software, or a combination thereof. As used in this application, the terms "logic," "component," "layer," "system," "circuitry," and/or "module" are intended to refer to a computer-related entity, either hardware, a combination of hardware and software, software, or software in execution, examples of which are provided by the exemplary computing architecture 900. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), memory units, logic gates, registers, semiconductor device, chips, microchips, chip sets, software components, programs, applications, firmware, software modules, computer code, combinations of any of the foregoing, and/or the like.

Data unit processing logic 220 may be operative to implement processing of data units for apparatus 205. In some embodiments, data units may include encrypted packets (see, for example, FIG. 4). Although packets may be used in some examples, embodiments are not so limited, as any data unit capable of operating according to various embodiments are contemplated herein. For example, data unit may include encrypted files, encrypted data streams, and/or the like. Processing of data units by data unit processing logic 220 may include implementing flow control operations for encrypted packets. Non-limiting examples of flow control operations may include determining non-conforming packets, determining packet priority, decrypting all or a portion of a packet, and/or transmitting packets (for example, to nodes 280a-n via network 270). In some embodiments, apparatus 205 may include or may have access to cryptography logic 230. In various embodiments, cryptography logic 230 may be operably coupled to or otherwise usable by processing circuitry and/or data processing logic 220 to decrypt all or a portion of encrypted packets according to some embodiments.

In exemplary embodiments, apparatus 205 may be operative to implement a flow control process for encrypted packets received at apparatus 205. Data unit processing logic 220 may determine target portions of a packet that include data unit processing information 250 (or "processing information") that indicates how a packet should be processed. The target portions may include various portions or segments of the packet, such as a header of the packet. Data processing logic 220 may decrypt, or cause to be decrypted (for instance, via cryptography logic 230) only the target portions of a packet to determine processing information 250. Data unit processing logic 220 may then process the packet according to the processing information 250 (see, for example, FIG. 6).

Accordingly, apparatus 205 according to some embodiments may use a limited partial decryption of packets to analyze (or "peek" into) encrypted packets to determine processing information 250, while not using resources to decrypt the remainder of the packet that does not relate to processing by data unit processing logic 220. The processing information 250 may be used by data unit processing logic 220 to perform flow control operations on the partially-decrypted packets, such as policy, routing, QoS, prioritization, and/or the like without the need to decrypt the entire packet. In this manner, apparatus 205 may provide early identification (for instance, earlier in the processing path compared with conventional systems) of an encrypted packet so that, among other things, high priority packets may be accelerated through the packet processing operations and non-conforming packets may be dropped early (for instance, eliminating resources used to process non-conforming packets discovered later in the packet processing operations in conventional systems). For example, data unit processing logic 220 may decrypt the first 18 bytes of the encrypted part of a packet to allow a workload to review the inner decrypted 802.1 priority code point (PCP) or Ethernet priority bits, UP, class of service (CoS), type of service (ToS), and/or the like.

In this manner, apparatus 205 may provide early detection of high priority packets, for example, based on decrypted header information (for instance, inner differentiated services code point (DSCP) information). Such early processing may allow for high priority policing, routing, and QoS decisions to be made earlier in the packet processing pathway than in conventional systems, which results in, among other things, lower latency for high priority packets. In addition, non-conforming packets may be detected earlier and discarded earlier than possible in conventional systems, saving resources and bandwidth. Furthermore, some embodiments may remove head-of-line blocking when software or hardware accelerators are used (or example, all packets go to accelerators for decryption, therefore, they slow smaller and potentially higher-priority packets). Moreover, exemplary embodiments may provide various performance benefits for processing encrypted packets. For example, processing of decrypted packets may require fewer cycles because only a portion of a packet may be encrypted according to some embodiments for flow control processing compared with an entire packet for conventional systems (for instance, for an MTU-sized packet, embodiments may provide a 30-fold performance benefit with respect to processing cycles).

In some embodiments, apparatus 205 may be a network device for implementing a secure connection, such as a VPN, IPSec tunnel, and/or the like. For example, apparatus 205 may be a network middle-box. In various embodiments, apparatus 205 may be arranged within network 270 terminating a security connection (for instance, an IPSec tunnel) for one or more of nodes 280a-n. In some embodiments, one or more of nodes 280a-n may be configured the same or substantially similar to apparatus 205. In various embodiments, apparatus 205 may have access to per-flow security keys, for example, via cryptography logic 230, as apparatus 205 may operate to generate and/or terminates encrypted packets within the security connection of network 270. In some embodiments, apparatus 205 may be and/or may implement mobile network gateways (for instance, within 3G networks, 4G networks, 5G networks, and/or revisions thereto), such as SGW/PGW, general purpose security gateway appliances, load balancers (having a VPN termination), broadband networks (for example, BNG gateways), and/or the like.

Figure 3:
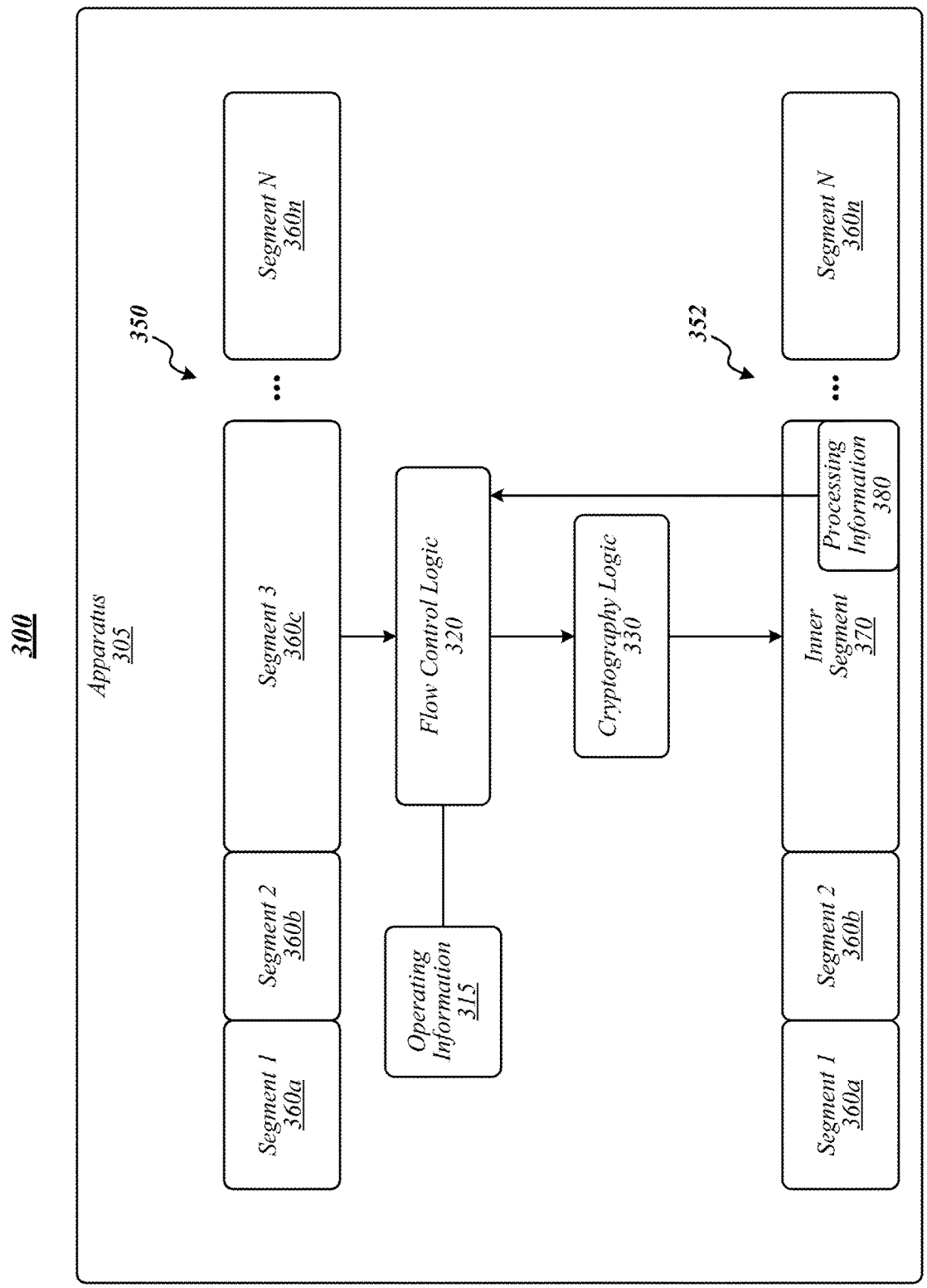
FIG. 3 illustrates an embodiment of a third operating environment.

FIG. 3 illustrates an example of an operating environment 300 that may be representative of some embodiments. As shown in FIG. 3, operating environment 300 may include an apparatus 305 having processing circuitry (not shown) operative to access and/or execute flow control logic 320 and/or cryptography logic 330 to perform data unit processing according to various embodiments. In various embodiments, apparatus 305 may be or may be substantially similar to apparatus 205 and/or nodes 110a-n. A data unit 350 having a plurality of segments 360a-n may be received by apparatus 305. Data unit 350 may include a packet and segments 360a-n may include various portions of a packet, such as headers, payloads, and/or the like.

In some embodiments, portions of packet 350 may be encrypted according to an encryption protocol. For example, segments 360c-n may be encrypted, while segments 360a and 360b may be unencrypted headers (for instance, headers added as part of the encryption process). Packet 350 may be provided to flow control logic 320, which may process the unencrypted or "outer" layers of packet 350, such as segment 360a and 360b. Non-limiting examples of processing of outer layers of packet 350 may include authentication, determining the type of encryption, QoS information, and/or the like. However, processing of the outer layers may not be sufficient to fully process packet 350, which may require accessing processing information within the encrypted portions of the packet (for instance, segments 360c-n).

Flow control logic 320 may determine which segment or segments of packet 350 need to be decrypted in order to determine processing information 380. For example, flow control logic 320 may include and/or may access operational information 315 configured to indicate which segment or segments to decrypt, for instance, based on information in the outer layers, type of packet, firmware, policies, and/or the like. In some embodiments, the type of the packet may include a communication protocol for the packet. For example, an Ethernet protocol packet may include certain segments known to include processing information, while a Multiprotocol Label Switching (MPLS) or Layer 2.5 packet may include the same or other segments that include processing information.

Flow control logic 320 may use or otherwise access cryptography logic 330 to decrypt the portion of packet 350 to access processing information. For example, flow control logic 320 may determine that segment 360c (the "flow control segment") requires decryption. Cryptography logic 330 may decrypt segment 360c of packet 350 to generate partially-decrypted packet 352 having a decrypted inner segment 370. Flow control logic 320 may access processing information from inner segment 370 for processing of partially-decrypted packet 352 (or, in some embodiments, original packet 350) according to various embodiments. In some embodiments, a flow control segment may include a discrete segment of a data unit, such as a header or a payload. In some embodiments, a flow control segment may include a specified length (for instance, a number of bits) of a portion of a data unit. For example, a flow control segment may include the first x bytes of a portion of an encrypted segment.

Figure 4:
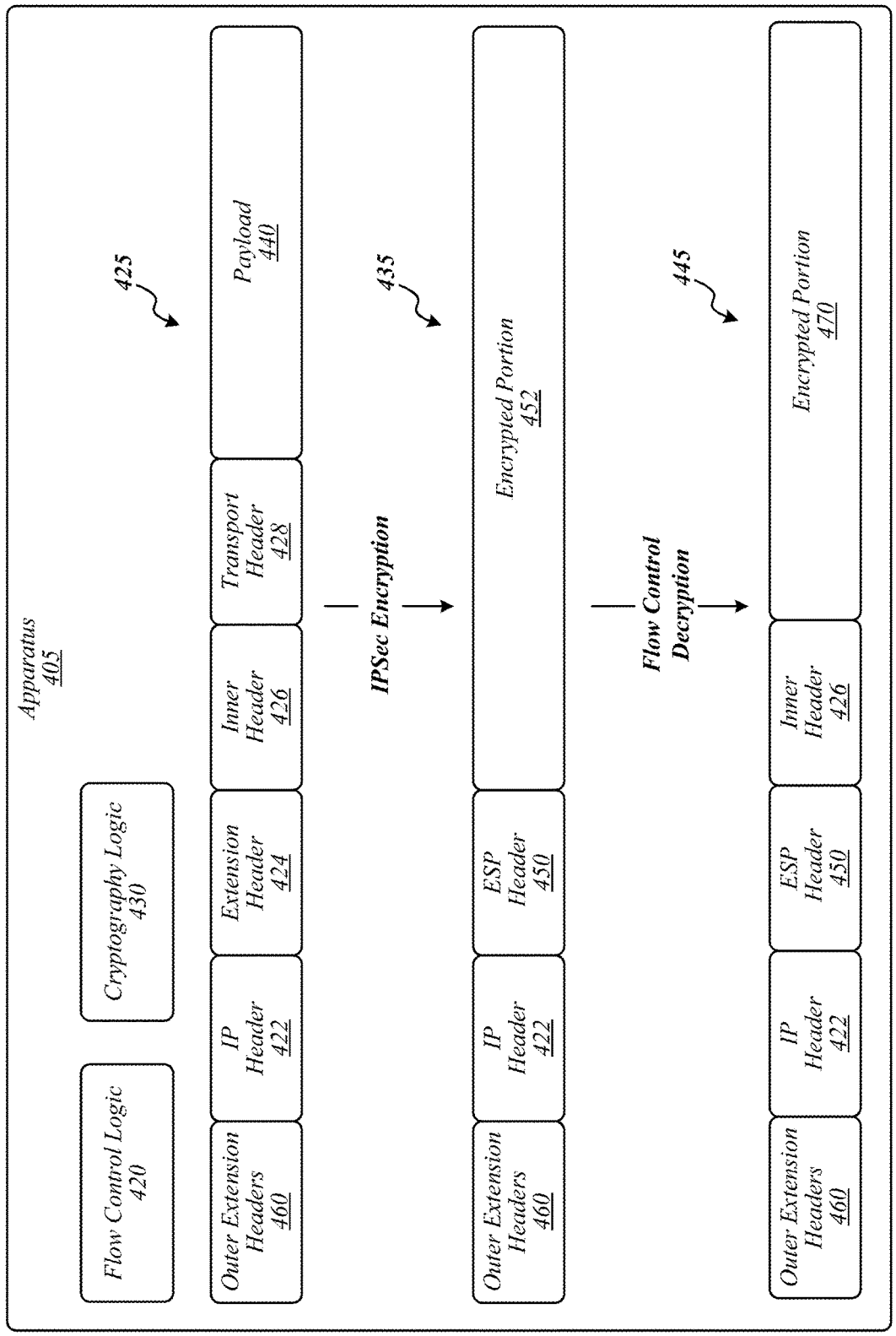
FIG. 4 illustrate an embodiment of a fourth operating environment.

FIG. 4 illustrates an example of an operating environment 400 that may be representative of some embodiments. As shown in FIG. 4, operating environment 400 may include an apparatus 405 having processing circuitry (not shown) operative to access and/or execute flow control logic 420 and/or cryptography logic 430 to perform data unit processing according to various embodiments. Although only one apparatus is depicted in FIG. 4, the operations performed by apparatus 405 may be performed by a plurality of apparatuses. For example, a first apparatus (for instance, a server) may perform encryption and a second apparatus (for instance, a networking appliance, a gateway, router, middlebox, and/or the like) may perform flow-control decryption. In some embodiments, apparatus 405 may be or may be substantially similar to apparatus 205 and/or 305 or nodes 110a-n.

A packet 425 may be generated, which includes various segments, such as an IP header 422, an extension header 424, an inner header 426, a transport header 428, and/or a payload 440. At least a portion of packet 425 may be encrypted using an encryption protocol. In some embodiments, packet 425 may include various outer extension headers 460. For example, packet 425 may be a Multiprotocol Label Switching (MPLS) or Layer 2.5 packet, a QinQ or IEEE 802.1ad packet, a packet having network service headers (NSH), and/or the like having outer extension headers 460. In some embodiments, outer extension headers 460 may include various information, such as priority information, QoS information, and/or the like. In some embodiments, the outer extension headers 460 may precede or be in front of IP header 422.

In exemplary embodiments, packet 425 may undergo ESP IPSec encryption to become an encrypted packet 435 including an ESP header 450 and an encrypted portion 452 (for instance, an encrypted payload 440 and encrypted headers, such as extension header 424, inner header 426, transport header 428). In some embodiments, packet 435 may be generated at first computing device and transmitted via a network (for example, network 105 or 270) to a second computing device (for example, a network device such as apparatus 205) for processing. In some embodiments, certain headers may be preserved and non-encrypted ("preserved headers") in encrypted packet 435, such as IP header 422 and/or outer extension headers 460.

Flow control logic 420 may determine that at least a portion of the processing information is within inner header 426, while the remaining encrypted portions of encrypted packet 435 are not required for flow control processing of encrypted packet 435. In some embodiments, flow control logic 420 may make the determination of the location of processing information based on hardware/software instructions of or accessible by flow control logic 420. For example, flow control logic 420 may be programmed or otherwise configured to decrypt inner header 426 of encrypted packets for processing information. In various embodiments, flow control logic 420 may obtain information from the outer layers of encrypted packet ("outer layer information") and may use this information to determine the segments of an encrypted packet for decryption. For example, IP header 422 and/or ESP header of encrypted packet 435 may include outer layer information indicating that the processing information is located in inner header 426.

Flow control logic 420 may, for example, via cryptography logic 430, perform a flow control decryption process to partially decrypt encrypted packet 435 to generate partially-decrypted packet 445. As shown in FIG. 4, partially-decrypted packet 445 may have inner packet 426 decrypted, while the other portions of encrypted portion 452 may remain encrypted as encrypted portion 470 (or encrypted portion remainder 470). Flow control logic 420 may access processing information of inner header 426 for processing of partially-decrypted packet 445 according to some embodiments.

In some embodiments, flow control logic 420 may decrypt more, less, or different portions of encrypted packet 435 depending on the particular processing information required for processing encrypted packet 435. For example, in various embodiments, flow control logic 420 may operate to perform a first processing operation (for instance, packet prioritization) that only requires processing information from a first portion of encrypted portion 452, such as inner header 426. Accordingly, only the first portion (for instance, inner header 426) may be decrypted to generate partially-decrypted packet 445. In another example, flow control logic 420 may operate to perform a second processing operation that requires information from a second portion of encrypted portion 452, such as transport header 428. Accordingly, only the second portion (for instance, transport header 428) may be decrypted to generate partially-decrypted packet 445. In a further example, flow control logic 420 may operate to perform the first and second processing operations and, therefore, flow control logic 420 may decrypt both the first and second portions to generate partially-decrypted packet 445. In some embodiments, a portion of the processing information may be included in one or more of the preserved headers, such as IP header 422 and/or outer extension headers 460. In various embodiments, the processing information in the preserved headers or outer layer information may be combined with processing information within inner IP header 426 (or other decrypted portion of partially-decrypted packet 445) to provide information or instructions for processing partially-decrypted packet. For example, an extension header 460 may include priority information, which may be combined with processing information of inner IP header 426 to make a prioritization decision.

Included herein are a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 5:
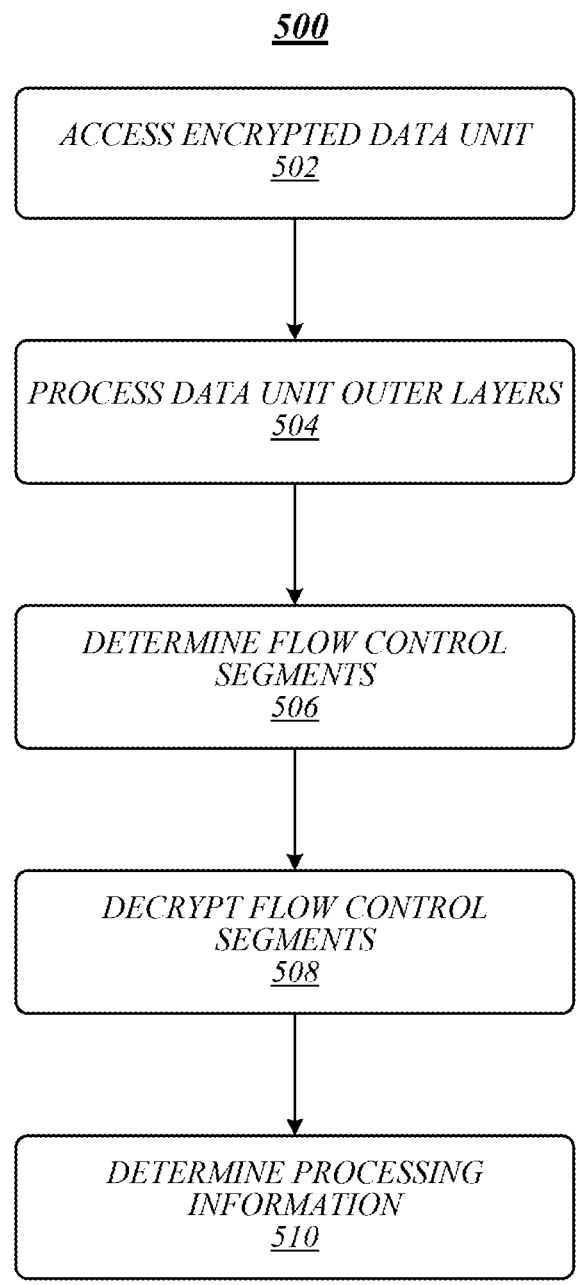
FIG. 5 illustrates an embodiment of a first logic flow.

FIG. 5 illustrates an embodiment of a logic flow 500. Logic flow 500 may be representative of some or all of the operations executed by one or more embodiments described herein, such as operations executed by one or more of apparatuses 205, 305, and/or 405. For example, logic flow 500 may generally include operations for an apparatus, such as a networking device (for instance, a middle box) to determine processing information for an encrypted packet.

At block 502, logic flow 500 may access an encrypted data unit. For example, flow control logic 320 may receive encrypted data unit 350 in the form of an encrypted packet. Logic flow 500 may process data unit outer layers at block 504. For example, flow control logic 320 may process outer, non-encrypted layers of encrypted packet 350, such as IP headers, encryption headers (for instance, headers added to encrypted packet 350 during the encryption process, such as ESP header 450 of encrypted packet 435), and/or the like.

At block 506, logic flow 500 may determine flow control segments. In some embodiments, flow control segments may include segments of an encrypted data unit that include processing information. In various embodiments, processing of outer layers of an encrypted data packet may provide operational information, such as packet type, encryption type, QoS, and/or the like that flow control logic 320 may use to determine the flow control segments. In exemplary embodiments, flow control logic 320 may be programmed or otherwise configured to determine certain flow control segments, such as inner headers, segments with DSCP information, and/or the like. In various embodiments, flow control segments may change dynamically based on conditions, such as resource requirements, etc. For example, flow control logic 320 may provide certain processing operations based on (for instance, from an operator, an application, and/or the like), resource requirements, bandwidth, instructions, and/or the like. In one example, flow control logic 320 may perform a first processing operation under certain resource conditions (for instance, threshold based on processor performance, processor utilization, data traffic, bandwidth, and/or the like) which requires decryption of a first header of each encrypted packet. Flow control logic 320 may perform the first processing operation and a second processing operation under different conditions, which requires decryption of a first header and a certain number of bytes of a payload of each encrypted packet.

Logic flow 500 may decrypt the flow control segments at block 508. For example, flow control logic 320 may decrypt (or use cryptography logic 330 to decrypt) the flow control segments, such as segment 360c of encrypted packet 350 to generate unencrypted inner segment 370 of partially-decrypted packet 352. At block 510, logic flow 500 may determine processing information. For example, flow control logic 320 may access processing information 380 from decrypted inner segment 370.

Figure 6:
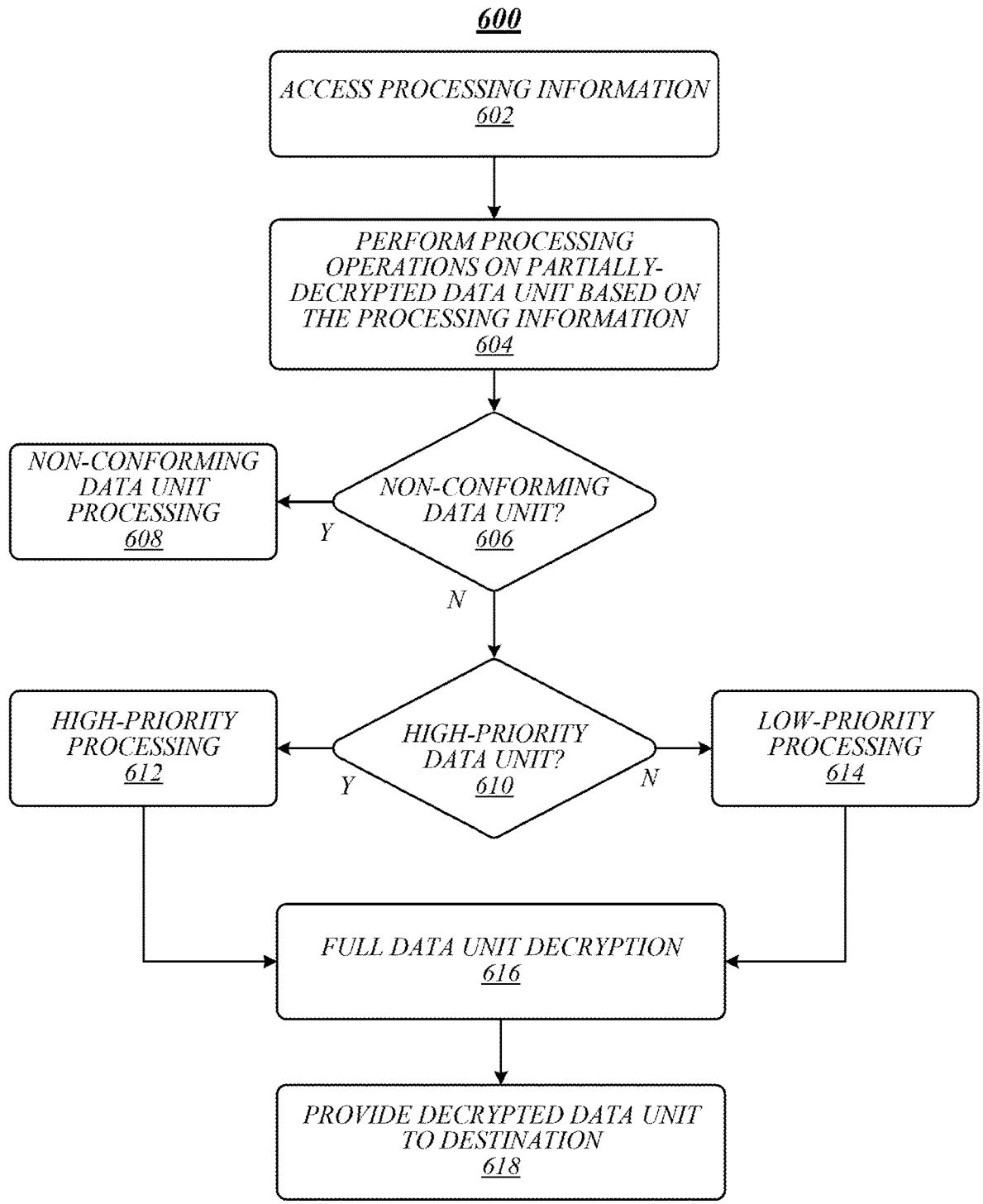
FIG. 6 illustrates an embodiment of a second logic flow.

FIG. 6 illustrates an embodiment of a logic flow 600. Logic flow 600 may be representative of some or all of the operations executed by one or more embodiments described herein, such as operations executed by one or more of apparatuses 205, 305, and/or 405. For example, logic flow 600 may generally include operations for an apparatus, such as a networking device (for instance, a middle box) to process a partially-decrypted packet.

At block 602, logic flow 600 may access processing information. For example, flow control logic 320 may receive or otherwise access processing information 380 (for instance, obtained using the process described in logic flow 500 of FIG. 5) of partially-decrypted packet 352. Logic flow 600 may perform processing operations on a partially-decrypted data unit based on the processing information at block 604. For example, flow control logic 320 may perform various processing operations on partially-decrypted packet 352, such as certain classification operations, based on the processing information 380 (for instance, inner header information of partially-decrypted packet 352). Non-limiting examples of processing operations may include non-conforming data unit classification, priority classification, transmission classification, policy-based processing, routing, QoS processing, and/or the like.

Logic flow 600 may determine whether the partially-decrypted data unit is a non-conforming data unit at block 606. For example, flow control logic 320 may use processing information 380 of partially-decrypted packet 352 to determine whether packet 350 (and/or partially-decrypted packet 352) is a non-conforming packet based on one or more conformity criteria. Non-limiting examples of conformity criteria may include conforming to a communication specification, destined for a congested node or network, token depth, bandwidth capacity, exceeding a defined limit (for instance, a burst limit), conforming packet segments (for instance, header, etc.), conforming encryption protocol, corrupt data, packet size, packet source, and/or the like. In some embodiments, conformity criteria may include any type of criteria known in the art for determining whether a packet is a non-conforming packet that may operate according to various embodiments. At block 606, if logic flow 600 determines that the data unit is a non-conforming data unit, logic flow 600 may perform non-conforming data unit processing at block 608. For example, flow control logic 320 may discard a non-conforming data partially-decrypted packet 352 and/or increment a count of non-conforming packets.

At block 606, if logic flow 600 determines that the data unit is not a non-conforming data unit, logic flow 600 may determine whether the data unit is a high-priority data unit at block 610. For example, flow control logic 320 may analyze processing information 380 of partially-decrypted packet 352 to classify partially-decrypted packet 352 based on priority information of processing information 380. If logic flow 600 determines that the data unit is a high-priority data unit at block 610, logic flow 600 may perform high-priority processing at block 612. For example, high-priority data units may be sent immediately (or placed in a queue) for processing (for example, to an accelerator or other processing device, circuitry, logic, and/or the like) and not blocked behind lower-priority data units or non-conforming data units as occurs in conventional systems. If logic flow 600 determines that the data unit is not a high-priority data unit at block 610, logic flow 600 may perform low-priority processing at block 614. For example, low priority data units may be sent for processing with a lower priority or placed in a queue behind higher priority data units.

At block 616, logic flow 600 may perform full data decryption. For example, flow control logic 320 may fully decrypt partially-decrypted packet 352 (for instance, decrypting segment 360*n*) to generate a fully decrypted packet. Logic flow 600 may provide the decrypted data unit to the destination at block 618. For example, data unit processing logic 220 may transmit the decrypted data unit via network interface 260*a-n* to network 270 to the ultimate destination node 280*a-n* (which may travel via one or more intermediate nodes 280*a-n*).

Figure 7:
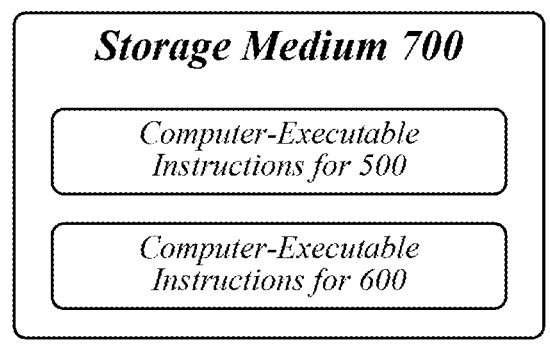
FIG. 7 illustrates an embodiment of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 500 and/or logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
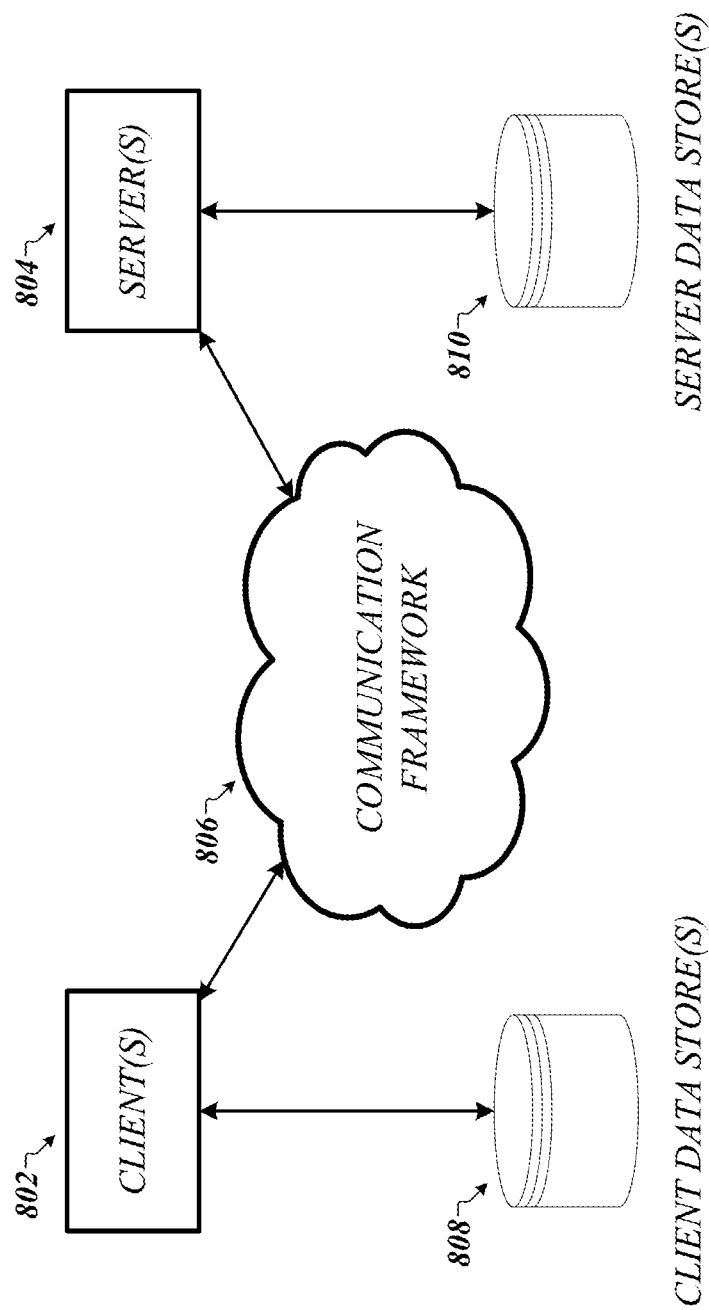
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 and the servers 804 are operatively connected to one or more respective client data stores 808 and server data stores 810 that can be employed to store information local to the respective clients 802 and servers 804, such as cookies and/or associated contextual information. Any one of clients 802 and/or servers 804 may implement one or more of apparatus 205, 305, and/or 405 and/or logic flows 500 and/or 600, storage medium 900, and/or computing architecture 900.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
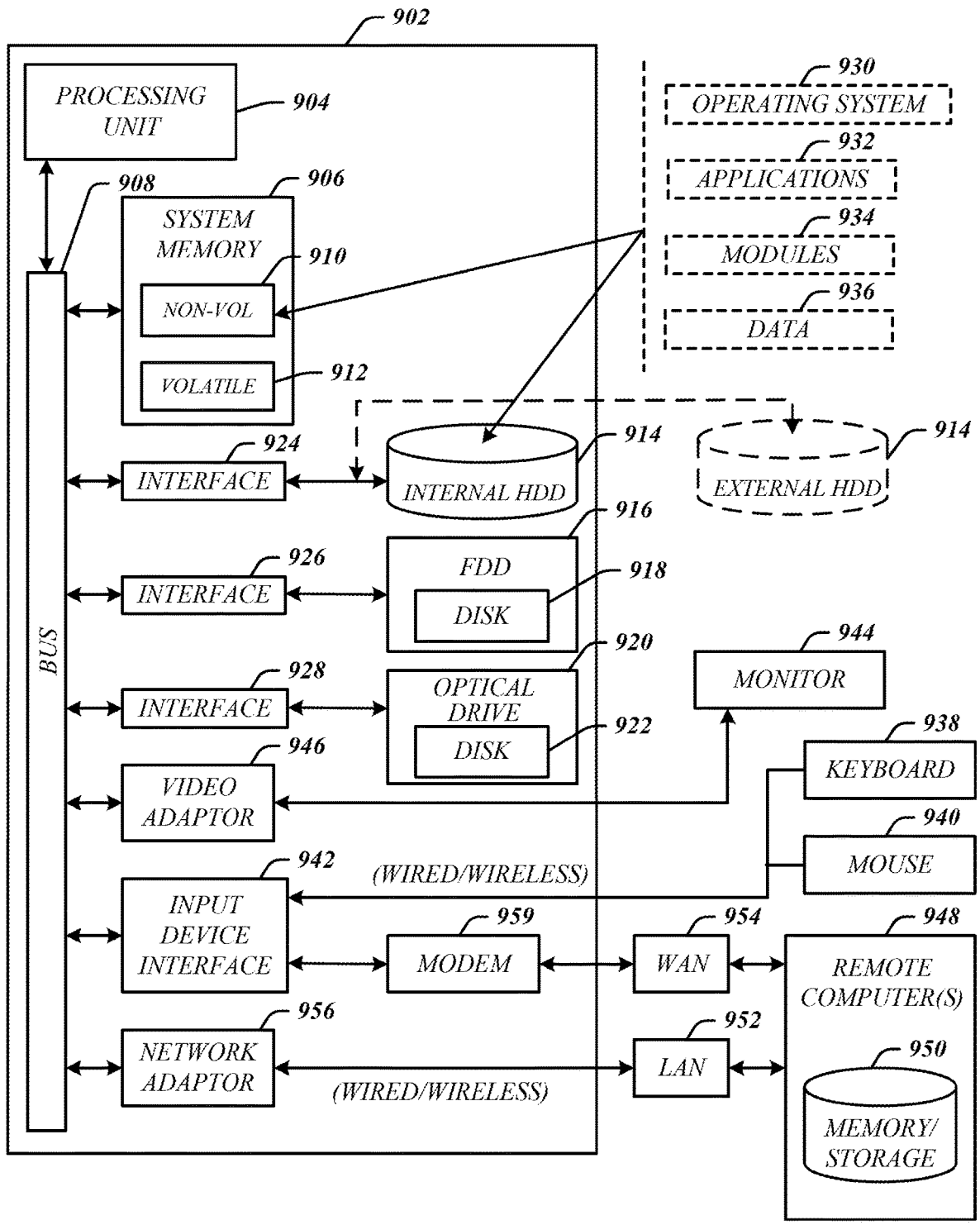
FIG. 9 illustrates an example computing platform.

FIG. 9 illustrates an embodiment of an exemplary computing architecture 900 suitable for implementing various embodiments as previously described. In various embodiments, the computing architecture 900 may comprise or be implemented as part of an electronic device. In some embodiments, the computing architecture 900 may be representative, for example, of apparatuses 205, 305, and/or 405. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of compute nodes 150, 405, 505, and/or 605 and server node 150.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1384 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include non-limiting example embodiments:

Example 1 is an apparatus for networking, comprising at least one memory, logic, at least a portion of the logic comprised in hardware coupled to the at least one memory, the logic to access an encrypted packet having an encrypted portion, determine at least one flow control segment of the encrypted portion, decrypt the at least one flow control segment to generate a partially-decrypted packet comprising a decrypted at least one flow control segment and an encrypted remainder portion, the remainder portion comprising a portion of the encrypted packet that does not include the decrypted at least one flow control segment, access process information in the decrypted at least one flow control segment, and process the partially-decrypted packet according to the process information.

Example 2 is the apparatus of Example 1, the encrypted packet encrypted according to an Internet Protocol Security (IPSec) protocol.

Example 3 is the apparatus of Example 1, the encrypted packet encrypted according to an Internet Protocol Security (IPSec) Encapsulating Security Payload (ESP) protocol.

Example 4 is the apparatus of Example 1, the logic to determine the at least one flow control segment based on a type of the encrypted packet.

Example 5 is the apparatus of Example 1, the logic to determine the at least one flow control segment based on a type of the encrypted packet, the type comprising a communication protocol for the encrypted packet.

Example 6 is the apparatus of Example 1, the at least one flow control segment comprising a header.

Example 7 is the apparatus of Example 1, the at least one flow control segment comprising an inner header.

Example 8 is the apparatus of Example 1, the at least one flow control segment comprising a specified length of the encrypted portion.

Example 9 is the apparatus of Example 1, the at least one flow control segment comprising a specified number of bits of the encrypted portion.

Example 10 is the apparatus of Example 1, the encrypted packet comprising an unencrypted portion, the unencrypted portion comprising an Internet protocol (IP) header.

Example 11 is the apparatus of Example 1, the encrypted packet comprising an unencrypted portion, the unencrypted portion comprising an Internet protocol (IP) header and at least one outer extension header.

Example 12 is the apparatus of Example 1, the logic to determine processing information from an unencrypted portion of the encrypted packet, the unencrypted portion comprising at least one of an Internet protocol (IP) header and at least one outer extension header.

Example 13 is the apparatus of Example 1, the processing information comprising differentiated services code point (DSCP) information.

Example 14 is the apparatus of Example 1, the logic to classify the partially-decrypted packet based on the processing information.

Example 15 is the apparatus of Example 1, the logic to determine whether the partially-decrypted packet is a non-conforming packet based on the processing information.

Example 16 is the apparatus of Example 1, the logic to determine a priority of the partially-decrypted packet based on the processing information.

Example 17 is the apparatus of Example 1, the logic to decrypt the remainder portion of the partially-decrypted packet to generate a decrypted packet.

Example 18 is the apparatus of Example 1, the logic to decrypt the remainder portion of the partially-decrypted packet to generate a decrypted packet, and transmit the decrypted packet.

Example 19 is a system, comprising the apparatus according to any of Examples 1-18, and at least one network interface.

Example 20 is a method for networking, comprising at least one memory, logic, at least a portion of the logic comprised in hardware coupled to the at least one memory, the logic to access an encrypted packet having an encrypted portion, determine at least one flow control segment of the encrypted portion, decrypt the at least one flow control segment to generate a partially-decrypted packet comprising a decrypted at least one flow control segment and an encrypted remainder portion, the remainder portion comprising a portion of the encrypted packet that does not include the decrypted at least one flow control segment, access process information in the decrypted at least one flow control segment, and process the partially-decrypted packet according to the process information.

Example 21 is the method of Example 20, the encrypted packet encrypted according to an Internet Protocol Security (IPSec) protocol.

Example 22 is the method of Example 20, the encrypted packet encrypted according to an Internet Protocol Security (IPSec) Encapsulating Security Payload (ESP) protocol.

Example 23 is the method of Example 20, comprising determining the at least one flow control segment based on a type of the encrypted packet.

Example 24 is the method of Example 20, comprising determining the at least one flow control segment based on a type of the encrypted packet, the type comprising a communication protocol for the encrypted packet.

Example 25 is the method of Example 20, the at least one flow control segment comprising a header.

Example 26 is the method of Example 20, the at least one flow control segment comprising an inner header.

Example 27 is the method of Example 20, the at least one flow control segment comprising a specified length of the encrypted portion.

Example 28 is the method of Example 20, the at least one flow control segment comprising a specified number of bits of the encrypted portion.

Example 29 is the method of Example 20, the encrypted packet comprising an unencrypted portion, the unencrypted portion comprising an Internet protocol (IP) header.

Example 30 is the method of Example 20, the encrypted packet comprising an unencrypted portion, the unencrypted portion comprising an Internet protocol (IP) header and at least one outer extension header.

Example 31 is the method of Example 20, comprising determining processing information from an unencrypted portion of the encrypted packet, the unencrypted portion comprising at least one of an Internet protocol (IP) header and at least one outer extension header.

Example 32 is the method of Example 20, the processing information comprising differentiated services code point (DSCP) information.

Example 33 is the method of Example 20, comprising classifying the partially-decrypted packet based on the processing information.

Example 34 is the method of Example 20, comprising determining whether the partially-decrypted packet is a non-conforming packet based on the processing information.

Example 35 is the method of Example 20, comprising determining a priority of the partially-decrypted packet based on the processing information.

Example 36 is the method of Example 20, comprising decrypting the remainder portion of the partially-decrypted packet to generate a decrypted packet.

Example 37 is the method of Example 20, comprising decrypting the remainder portion of the partially-decrypted packet to generate a decrypted packet, and transmitting the decrypted packet.

Example 38 is a computer-readable storage medium that stores computer-executable instructions for execution by processing circuitry of a computing device, the computer-executable instructions, when executed, to cause the computing device to access an encrypted packet having an encrypted portion, determine at least one flow control segment of the encrypted portion, decrypt the at least one flow control segment to generate a partially-decrypted packet comprising a decrypted at least one flow control segment and an encrypted remainder portion, the remainder portion comprising a portion of the encrypted packet that does not include the decrypted at least one flow control segment, access process information in the decrypted at least one flow control segment, and process the partially-decrypted packet according to the process information.

Example 39 is the computer-readable storage medium of Example 38, the encrypted packet encrypted according to an Internet Protocol Security (IPSec) protocol.

Example 40 is the computer-readable storage medium of Example 38, the encrypted packet encrypted according to an Internet Protocol Security (IPSec) Encapsulating Security Payload (ESP) protocol.

Example 41 is the computer-readable storage medium of Example 38, the computer-executable instructions, when executed, to cause the computing device to determine the at least one flow control segment based on a type of the encrypted packet.

Example 42 is the computer-readable storage medium of Example 38, the computer-executable instructions, when executed, to cause the computing device to determine the at least one flow control segment based on a type of the encrypted packet, the type comprising a communication protocol for the encrypted packet.

Example 43 is the computer-readable storage medium of Example 38, the at least one flow control segment comprising a header.

Example 44 is the computer-readable storage medium of Example 38, the at least one flow control segment comprising an inner header.

Example 45 is the computer-readable storage medium of Example 38, the at least one flow control segment comprising a specified length of the encrypted portion.

Example 46 is the computer-readable storage medium of Example 38, the at least one flow control segment comprising a specified number of bits of the encrypted portion.

Example 47 is the computer-readable storage medium of Example 38, the encrypted packet comprising an unencrypted portion, the unencrypted portion comprising an Internet protocol (IP) header.

Example 48 is the computer-readable storage medium of Example 38, the encrypted packet comprising an unencrypted portion, the unencrypted portion comprising an Internet protocol (IP) header and at least one outer extension header.

Example 49 is the computer-readable storage medium of Example 38, the computer-executable instructions, when executed, to cause the computing device to determine processing information from an unencrypted portion of the encrypted packet, the unencrypted portion comprising at least one of an Internet protocol (IP) header and at least one outer extension header.

Example 50 is the computer-readable storage medium of Example 38, the processing information comprising differentiated services code point (DSCP) information.

Example 51 is the computer-readable storage medium of Example 38, the computer-executable instructions, when executed, to cause the computing device to classify the partially-decrypted packet based on the processing information.

Example 52 is the computer-readable storage medium of Example 38, the computer-executable instructions, when executed, to cause the computing device to determine whether the partially-decrypted packet is a non-conforming packet based on the processing information.

Example 53 is the computer-readable storage medium of Example 38, the computer-executable instructions, when executed, to cause the computing device to determine a priority of the partially-decrypted packet based on the processing information.

Example 54 is the computer-readable storage medium of Example 38, the computer-executable instructions, when executed, to cause the computing device to decrypt the remainder portion of the partially-decrypted packet to generate a decrypted packet.

Example 55 is the computer-readable storage medium of Example 38, the computer-executable instructions, when executed, to cause the computing device to decrypt the remainder portion of the partially-decrypted packet to generate a decrypted packet, and transmit the decrypted packet.

Example 56 is an apparatus for networking, comprising a flow control segment determination means to access an encrypted packet having an encrypted portion, and determine at least one flow control segment of the encrypted portion, a partial-decryption means to decrypt the at least one flow control segment to generate a partially-decrypted packet comprising a decrypted at least one flow control segment and an encrypted remainder portion, the remainder portion comprising a portion of the encrypted packet that does not include the decrypted at least one flow control segment, and a flow control processing means to access process information in the decrypted at least one flow control segment, and process the partially-decrypted packet according to the process information.

Example 57 is the apparatus of Example 56, the encrypted packet encrypted according to an Internet Protocol Security (IPSec) protocol.

Example 58 is the apparatus of Example 56, the encrypted packet encrypted according to an Internet Protocol Security (IPSec) Encapsulating Security Payload (ESP) protocol.

Example 59 is the apparatus of Example 56, the flow control segment determination means to determine the at least one flow control segment based on a type of the encrypted packet.

Example 60 is the apparatus of Example 56, the flow control segment determination means to determine the at least one flow control segment based on a type of the encrypted packet, the type comprising a communication protocol for the encrypted packet.

Example 61 is the apparatus of Example 56, the at least one flow control segment comprising a header.

Example 62 is the apparatus of Example 56, the at least one flow control segment comprising an inner header.

Example 63 is the apparatus of Example 56, the at least one flow control segment comprising a specified length of the encrypted portion.

Example 64 is the apparatus of Example 56, the at least one flow control segment comprising a specified number of bits of the encrypted portion.

Example 65 is the apparatus of Example 56, the encrypted packet comprising an unencrypted portion, the unencrypted portion comprising an Internet protocol (IP) header.

Example 66 is the apparatus of Example 56, the encrypted packet comprising an unencrypted portion, the unencrypted portion comprising an Internet protocol (IP) header and at least one outer extension header.

Example 67 is the apparatus of Example 56, the flow control processing means to determine processing information from an unencrypted portion of the encrypted packet, the unencrypted portion comprising at least one of an Internet protocol (IP) header and at least one outer extension header.

Example 68 is the apparatus of Example 56, the processing information comprising differentiated services code point (DSCP) information.

Example 69 is the apparatus of Example 56, the flow control processing means to classify the partially-decrypted packet based on the processing information.

Example 70 is the apparatus of Example 56, the flow control processing means to determine whether the partially-decrypted packet is a non-conforming packet based on the processing information.

Example 71 is the apparatus of Example 56, the flow control processing means to determine a priority of the partially-decrypted packet based on the processing information.

Example 72 is the apparatus of Example 56, the flow control processing means to decrypt the remainder portion of the partially-decrypted packet to generate a decrypted packet.

Example 73 is the apparatus of Example 56, the flow control processing means to decrypt the remainder portion of the partially-decrypted packet to generate a decrypted packet, and transmit the decrypted packet.

Example 74 is a system, comprising the apparatus according to any of claims 56-73, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.112(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for networking, comprising:
processing circuitry configured to:
access an encrypted packet having an encrypted portion,
determine at least one flow control segment of the encrypted portion based at least in part on a communication protocol of the encrypted packet, the at least one flow control segment comprising a predetermined number of bits of the encrypted portion,
decrypt the at least one flow control segment to generate a partially-decrypted packet comprising a decrypted at least one flow control segment and an encrypted remainder portion, the encrypted remainder portion comprising a portion of the encrypted packet that does not include the decrypted at least one flow control segment,
access process information in the decrypted at least one flow control segment based at least in part on the communication protocol, and
process the partially-decrypted packet according to the process information.

2. The apparatus of claim 1, the encrypted packet encrypted according to an Internet Protocol Security (IPSec) protocol.

3. The apparatus of claim 1, the at least one flow control segment comprising a header.

4. The apparatus of claim 1, the at least one flow control segment comprising an inner header.

5. The apparatus of claim 1, the process information comprising differentiated services code point (DSCP) information.

6. The apparatus of claim 1, the circuitry to classify the partially-decrypted packet based on the process information.

7. The apparatus of claim 1, the circuitry to determine whether the partially-decrypted packet is a non-conforming packet based on one or more conformity criteria and the process information.

8. The apparatus of claim 1, the circuitry to determine a priority of the partially-decrypted packet based on the process information.

9. The apparatus of claim 1, the circuitry to:
decrypt a first portion of the encrypted remainder portion to generate another decrypted flow control segment and another encrypted remainder portion, the another encrypted remainder portion to comprise another portion of the encrypted packet that does not include: (i) the decrypted at least one flow control segment, and (ii) the decrypted another flow control segment.

10. The apparatus of claim 9, the circuitry to:
access process information in the another decrypted flow control segment based at least in part on the communication protocol;
process the packet according to the process information in the another decrypted flow control segment; and
decrypt the another encrypted remainder portion.

11. A method, comprising:
accessing an encrypted packet having an encrypted portion,
determining at least one flow control segment of the encrypted portion based at least in part on a communication protocol of the encrypted packet, the at least one flow control segment comprising a predetermined number of bits of the encrypted portion,
decrypting the at least one flow control segment to generate a partially-decrypted packet comprising a decrypted at least one flow control segment and an encrypted remainder portion, the remainder portion comprising a portion of the encrypted packet that does not include the decrypted at least one flow control segment,
accessing process information in the decrypted at least one flow control segment based at least in part on the communication protocol, and
processing the partially-decrypted packet according to the process information.

12. The method of claim 11, the encrypted packet encrypted according to an Internet Protocol Security (IPSec) protocol.

13. The method of claim 11, the at least one flow control segment comprising a header.

14. The method of claim 11, the at least one flow control segment comprising an inner header.

15. The method of claim 11, the at least one flow control segment comprising a specified length of the encrypted portion.

16. The method of claim 11, the process information comprising differentiated services code point (DSCP) information.

17. The method of claim 11, the processing comprising classifying the partially-decrypted packet based on the process information.

18. The method of claim 11, the processing comprising determining whether the partially-decrypted packet is a non-conforming packet based on the process information.

19. The method of claim 11, the processing comprising determining a priority of the partially-decrypted packet based on the process information.

20. A non-transitory computer-readable storage medium that stores computer-executable instructions for execution by processing circuitry, the computer-executable instructions, when executed, to cause the circuitry to:
access an encrypted packet having an encrypted portion;
determine at least one flow control segment of the encrypted portion based at least in part on a communication protocol of the encrypted packet, the at least one flow control segment comprising a predetermined number of bits of the encrypted portion;
decrypt the at least one flow control segment to generate a partially-decrypted packet comprising a decrypted at least one flow control segment and an encrypted remainder portion, the remainder portion comprising a portion of the encrypted packet that does not include the decrypted at least one flow control segment;
access process information in the decrypted at least one flow control segment based at least in part on the communication protocol; and
process the partially-decrypted packet according to the process information.

21. The computer-readable storage medium of claim 20, the encrypted packet encrypted according to an Internet Protocol Security (IPSec) protocol.

22. The computer-readable storage medium of claim 20, the at least one flow control segment comprising a header.

23. The computer-readable storage medium of claim 20, the computer-executable instructions, when executed, to cause the circuitry to determine whether the partially-decrypted packet is a non-conforming packet based on the process information.

24. The computer-readable storage medium of claim 20, the computer-executable instructions, when executed, to cause the circuitry to determine a priority of the partially-decrypted packet based on the process information.

\* \* \* \* \*